(12) United States Patent
Sinn

(10) Patent No.: US 9,432,371 B2
(45) Date of Patent: *Aug. 30, 2016

(54) HYBRID CLOUD IDENTITY MAPPING INFRASTRUCTURE

(71) Applicant: eBay Inc., San Jose, CA (US)

(72) Inventor: Richard Sinn, Milpitas, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/336,904

(22) Filed: Jul. 21, 2014

(65) Prior Publication Data

US 2014/0331300 A1 Nov. 6, 2014

Related U.S. Application Data

(63) Continuation of application No. 13/272,924, filed on Oct. 13, 2011, now Pat. No. 8,789,157.

(60) Provisional application No. 61/531,537, filed on Sep. 6, 2011.

(51) Int. Cl.

| | |
|---|---|
| *G06F 21/50* | (2013.01) |
| *H04L 29/06* | (2006.01) |
| *G06F 21/41* | (2013.01) |
| *H04L 29/08* | (2006.01) |
| *G06Q 10/10* | (2012.01) |

(52) U.S. Cl.
CPC ........... *H04L 63/0892* (2013.01); *G06F 21/41* (2013.01); *G06Q 10/10* (2013.01); *H04L 63/102* (2013.01); *H04L 67/10* (2013.01); *H04L 63/104* (2013.01)

(58) Field of Classification Search
CPC ....... G06F 21/41; G06F 21/50; H04L 63/102
USPC .......................................................... 726/7
See application file for complete search history.

(56) References Cited

U.S. PATENT DOCUMENTS

| | | | | |
|---|---|---|---|---|
| 6,981,043 | B2 * | 12/2005 | Botz et al. | 709/225 |
| 7,062,563 | B1 * | 6/2006 | Lewis et al. | 709/227 |
| 8,117,317 | B2 * | 2/2012 | Klimentiev et al. | 709/227 |
| 8,245,129 | B2 * | 8/2012 | Wilkinson et al. | 715/236 |
| 8,375,439 | B2 * | 2/2013 | Mann et al. | 726/17 |
| 8,789,157 | B2 | 7/2014 | Sinn | |
| 2013/0061306 | A1 | 3/2013 | Sinn | |

OTHER PUBLICATIONS

"U.S. Appl. No. 13/272,924, Non Final Office Action mailed Aug. 20, 2013", 10 pgs.
"U.S. Appl. No. 13/272,924, Notice of Allowance mailed Mar. 14, 2014", 11 pgs.
"U.S. Appl. No. 13/272,924, Response filed Dec. 20, 2013 to Non Final Office Action mailed Aug. 20, 2013", 12 pgs.

* cited by examiner

*Primary Examiner* — William Powers
(74) *Attorney, Agent, or Firm* — Schwegman, Lundberg & Woessner, P.A.

(57) ABSTRACT

In various exemplary embodiments, a system and associated method for providing a hybrid cloud computing environment are disclosed. For example, a system may authorize an enterprise user based on an enterprise identity. Once authenticated, embodiments may use mapping data and a cloud role to determine an identity to use when the enterprise user accesses a cloud.

20 Claims, 6 Drawing Sheets

HYBRID CLOUD IDENTITY MAPPING INFRASTRUCTURE

CROSS REFERENCE TO RELATED APPLICATIONS

This application is a continuation of and claims the benefit of priority under to U.S. patent application Ser. No. 13/272,924, filed on Oct. 13, 2011, which claims the benefit of priority under to U.S. Provisional Patent Application Ser. No. 61/531,537, filed Sep. 6, 2011, all of which are incorporated herein by reference in their entirety for all purposes.

TECHNICAL FIELD

The present application relates generally to the field of computer technology; and, in a specific exemplary embodiment, to a system and method of managing identity within a hybrid cloud.

BACKGROUND

In general, cloud computing is a computing paradigm in which tasks are assigned to a combination of connections, software, or services accessed over a network. This network of connections, software, and services is collectively known as a "cloud." Cloud computing typically provides an on-demand, scalable service for an infrastructure, platform, or application based on an on-premise or off-premise, pays-as-you-go operational model.

Cloud computing can be used by an enterprise in a number of ways. In one way, an enterprise may adopt a cloud computing solution to build data centers that store and house data and applications used by the enterprise in a private cloud. In another way, an enterprise may adopt a cloud computing solution to provide a resource-as-a-service in a public cloud.

BRIEF DESCRIPTION OF DRAWINGS

Various ones of the appended drawings merely illustrate exemplary embodiments of the present invention and must not be considered as limiting its scope.

DETAILED DESCRIPTION

Figure 1:
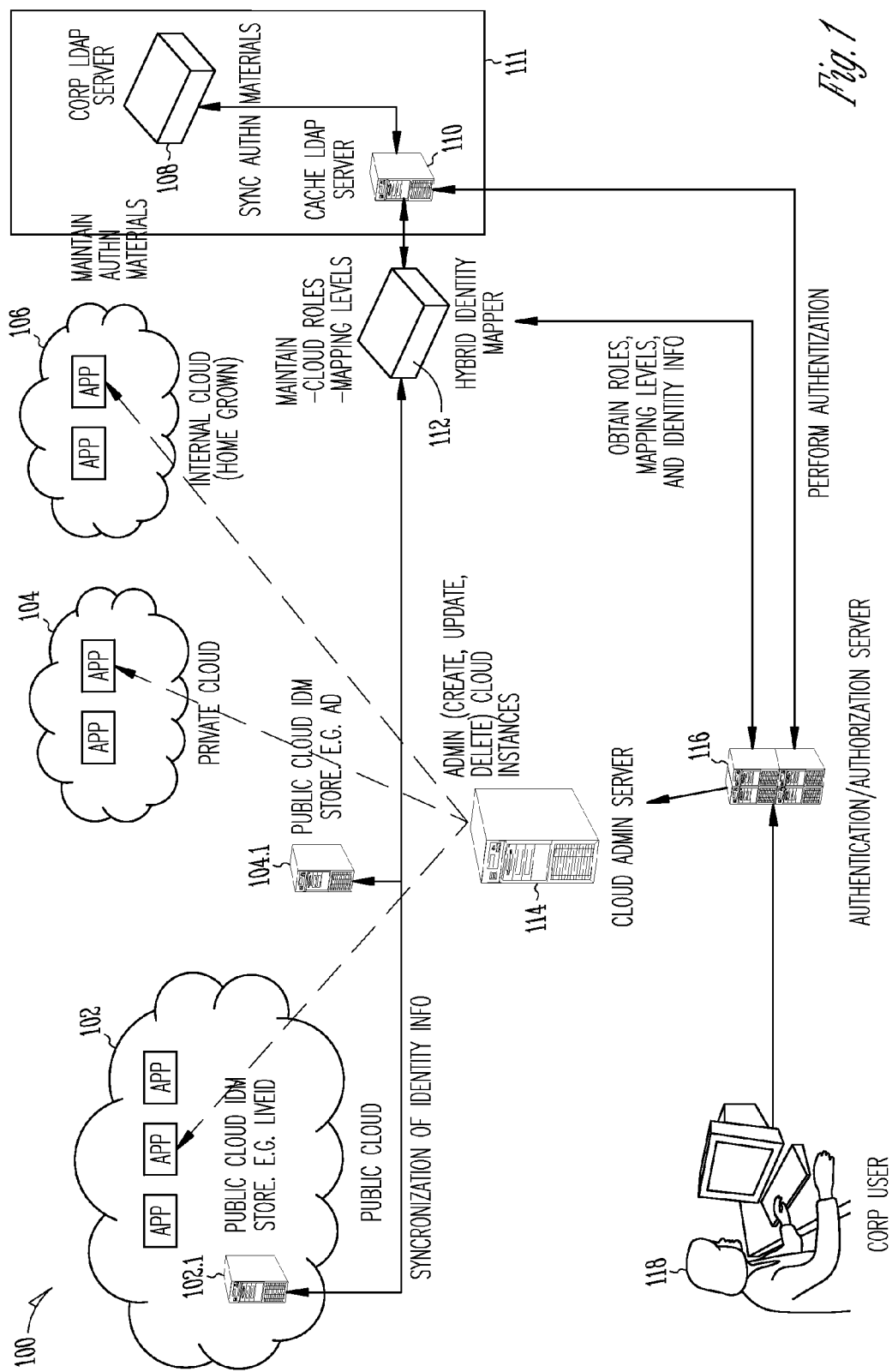
FIG. 1 depicts an exemplary block diagram of a hybrid cloud system, in accordance with various embodiments described herein.

A "hybrid cloud," as used herein, may refer to a cloud computing environment that a company provides to manage some resources in-house and other resources provided externally. A hybrid cloud is a composition of at least one private cloud and at least one public cloud. A private cloud may be a company home grown internal cloud, or a deployment managed by an external party (such as MICROSOFT) within the firewall of an enterprise.

To illustrate the concept of a hybrid cloud, an enterprise may use a public cloud service to serve static item data but continue to maintain in-house storage for operational customer data in a private cloud. Ideally, the hybrid approach allows an enterprise to take advantage of the scalability and cost effectiveness that a public cloud computing environment offers without exposing mission critical applications and data to third-party vulnerabilities.

Corporation identity is the identity used by enterprise users when they request and/or access enterprise resources, such as a network account or server. A major challenge in using a hybrid cloud is that the enterprise should avoid exposing corporation identity to any outside cloud providers when, for example, a developer in the enterprise wants to administer or deploy a cloud application. Once a corporation identity is exposed to the outside, it could lead to various attacks and vulnerabilities within the enterprise.

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. Further, well-known instruction instances, protocols, structures and techniques have not been shown in detail.

As used herein, the term "or" may be construed in an inclusive or exclusive sense. Similarly, the term "exemplary" may be construed merely to mean an example of something or an exemplar and not necessarily a preferred means of accomplishing a goal. Additionally, although various exemplary embodiments discussed below focus on an existing enterprise in a business environment, the embodiments are merely given for clarity in disclosure. Thus, any type of enterprise system such as a governmental system (including schools, court houses, and other judicially-related systems, etc.), religious, or any other non-business environment, is considered as being within the scope of the present invention.

In an exemplary embodiment, system architecture to provide cloud computing in an existing enterprise is disclosed. The system architecture comprises a service communications interface and an infrastructure communications interface. A cloud structure is communicatively coupled to the service communications interface and the infrastructure communications interface, with the cloud structure arranged to be coupled through the service communications interface to individual business units. The cloud structure is further arranged to be coupled through the infrastructure communications interface to a plurality of enterprise resources.

FIG. 1 is a block diagram that shows an example infrastructure of a hybrid cloud identity mapping system 100. The hybrid cloud identity mapping system 100 includes a public cloud 102, a private cloud 104, an internal cloud 106, an enterprise authorization server 108, a cache authorization server 110, a hybrid identity mapper 112, a cloud administrative server 114, an authentication/authorization (herein AA) server 116, and an enterprise user 118.

As described above, the public cloud 102 may be based on a standard cloud computing model, in which a service provider makes resources, such as applications and storage, available to the general public over a network (e.g., the Internet). The primary advantages of using a public cloud is that such a computing model is comparatively inexpensive (because, e.g., hardware and bandwidth costs are covered by the cloud provider), scalable, and, in terms of use of resources, efficient.

In comparison, the private cloud 104 may be based on a computing model that provides hosted services to a number of users within a firewall of an enterprise. As FIG. 1 shows, the private cloud 104 may be managed by a third party and is hosted external to the enterprise.

Similar to the private cloud 104, the internal cloud 106 may be based on a computing model that provides hosted services to a number of users within a firewall of an enterprise. However, unlike the private cloud 104, the internal cloud 106 may be a cloud infrastructure that is managed internally by the enterprise.

Each of the public cloud 102, the private cloud 104, and the internal cloud 106 of the hybrid cloud 101 may include various systems and subsystems. For example, public cloud 102 and private cloud 104 each may include an identity management server, such as 102.1 and 104.1 of FIG. 1. The identity management server 102.1 may identify users operating within, or control access to resources within cloud 102. The identity management servers 104.1 may perform the same role as identity management server 102.1 respective to cloud 104. For example, the identity management servers 102.1 and 104.1 may identify the enterprise user 118 and authorize as the user accesses the clouds 102, 104, and 106. In some embodiments, the SAML (Security Assertion Markup Language) protocol is used to exchange identity information between the various clouds.

The cloud administration server 114 provides services that allow a user to perform operations on the various resources of a cloud. Such operations may include creating an application on the cloud, updating an application on the cloud, deleting an application on the cloud, or any other suitable operation with respect to a cloud and its respective resources. In some embodiments, the cloud administration server 114 may further facilitate the monitoring of resource collections, management of capacity, policies, addition of cloud capacities, and other services.

In some embodiments, the cloud administration server 114 can further store, track and manage the identity and associated set of rights of an enterprise user to software, hardware, and other resources of the hybrid cloud. The cloud administration server 114 can further generate records of the usage of instantiated virtual machines to permit tracking, billing, and auditing of the services consumed by the enterprise user. In embodiments, the cloud administration server 114 can for example meter the usage and/or duration of an application, to generate subscription billing records for an enterprise user that has launched those machines. Other billing or value arrangements are possible.

The AA server 116 performs the functions of authorizing and authenticating an enterprise user. Authenticating can refer to any process by which you verify the identity of an enterprise user. That is, authentication can answer the question: Is an enterprise user who they claim they are? Authentication can involve the enterprise user answering a challenge question from the AA server 116. For example, the enterprise may be requested to submit a username and a password, or in other embodiments, may use other data that demonstrates identity, such as an IP address, certificate, or any other suitable data. As used herein, such data that is used to authenticate a user may be referred to as authentication data.

Authorization can refer to any process that determines if an enterprise user, once identified, is permitted to perform a requested act. Accessing a resource is an example of a requested act that may be authorized before being performed. Authorization may be performed by determining whether the enterprise user is a member of a group, if the enterprise user has a ticket that grants a right, or if the enterprise user has a particular level of security associated with a clearance.

To provide the authorization and authentication services, the AA server 116 may be communicatively coupled to an enterprise identity server 111 and a hybrid identity mapper 112. The enterprise identity server 111 may store enterprise identity. As used herein, "enterprise identity" may refer to the identity used internally by an enterprise. A user identifier (e.g., a user name), pass code, user role, and user group are examples of enterprise identity. Typically, user identity should be secured because such data may be used to compromise data from the enterprise. In some embodiments, the enterprise identity may be maintained and accessed according to LDAP (Lightweight Directory Access Protocol).

FIG. 1 shows that the enterprise identity server 111 can include an identity cache 110 and a main enterprise identity server 108. In such embodiments, the identity cache 110 is a replicated source of authentication materials from the main enterprise identity server 108. For example, the identity cache 110 can be used for data availability and data separation reasons. That is, the main enterprise identity server 108 can contain more data than for just cloud authentication.

Enterprise identity may be data used to authenticate an enterprise user and to authorize a request made by the enterprise identity server 111.

The hybrid identity mapper 112 stores hybrid cloud mapping data. As used herein, "hybrid cloud mapping data," may refer to data that maps an enterprise user identity to an identity usable in a cloud. To illustrate, mapping levels and cloud roles associated with particular enterprise users 118 are examples of hybrid cloud mapping data. Using the cloud roles and mapping levels, the hybrid identity mapper 112, or any other components, can map an enterprise identity to an identity usable in a private or public cloud. The method to perform such mapping is described below with reference to FIG. 3.

In addition to storing the mapping levels and cloud roles, the hybrid identity mapper may also synchronize the identity information, including directories (e.g., DIT) from both the private cloud and the public cloud providers 102, 104. The mapping implementation may be configured through an administration user interface provided by the hybrid identity mapper 112.

Figure 2:
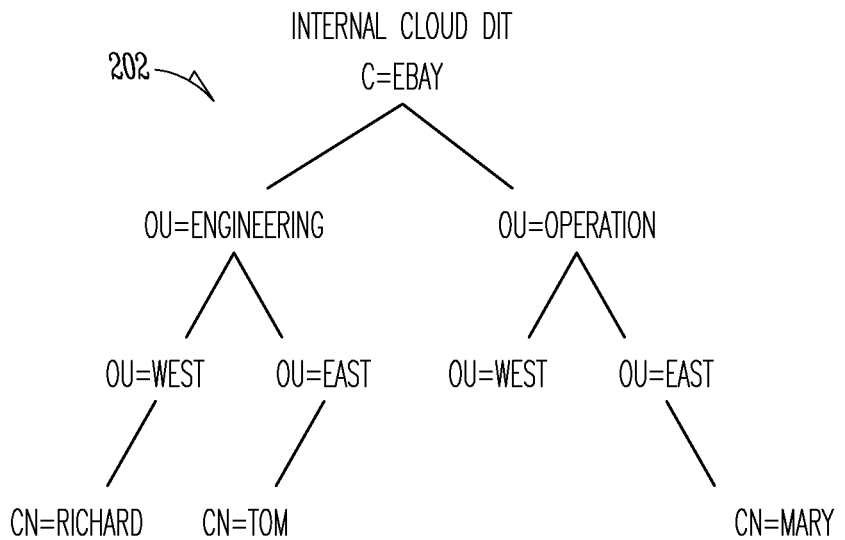
FIG. 2 depicts details of exemplary identity directories.
Figure 2:
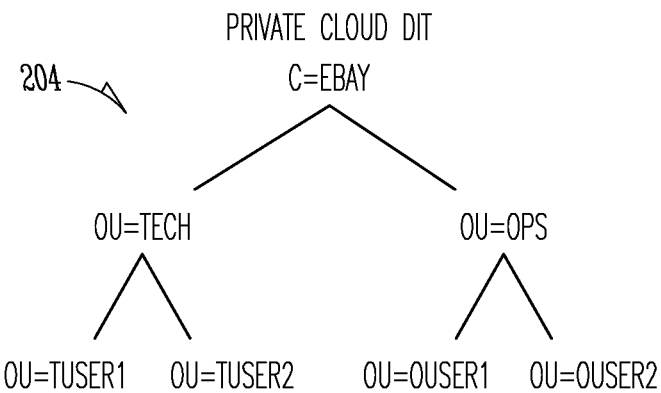
Figure 2:
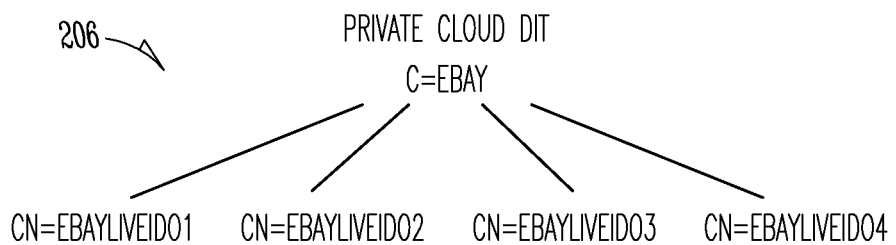

FIG. 2 is a diagram that shows various identity directories used by the hybrid identity mapper 112. Enterprise identity directory 202 illustrates a directory for enterprise identity that is used to identify a user with access to the internal account of an enterprise. For example, enterprise identity directory 202 may be used to organize and maintain enterprise identity, such as attributes relates to the enterprise user's account with the enterprise.

Private cloud identity directory 204 illustrates a directory for identity data that is used to identify a user with access to a private cloud. Similar to enterprise identity directory 202, each node of the private cloud identity directory 204 may include a set of attributes used to characterize an enterprise user's account with a private cloud (e.g., the private cloud 104 of FIG. 1).

Public cloud identity directory 206 illustrates a directory for identity data that is used to identify a user with access to a public cloud. Similar to the enterprise identity directory 202 and the private cloud identity directory 204, each node of the public cloud identity directory 206 may include a set of attributes used to characterize an enterprise user's account with a public cloud (e.g., the public cloud 102 of FIG. 1).

The mapping, as may be performed by a hybrid identity mapper 112, between the directories 202, 204, and 206 is further explained below with reference to FIG. 3. As FIG. 2 illustrates, the directories 202, 204, and 206 may be structured as directory information trees (DITs). A DIT is data represented in a hierarchical tree-like structure consisting of distinguished names of directory entries. Further, as FIG. 2 shows, the DITs may be organized with a top level that represents an organization (e.g., eBay) and then, in the lower levels of the hierarchy, a data model of the organization (e.g., departments, such Engineering, and locations, such as West). Still further, according to FIG. 2, the leaf entries may represent employees or user's within the organization.

Figure 3:
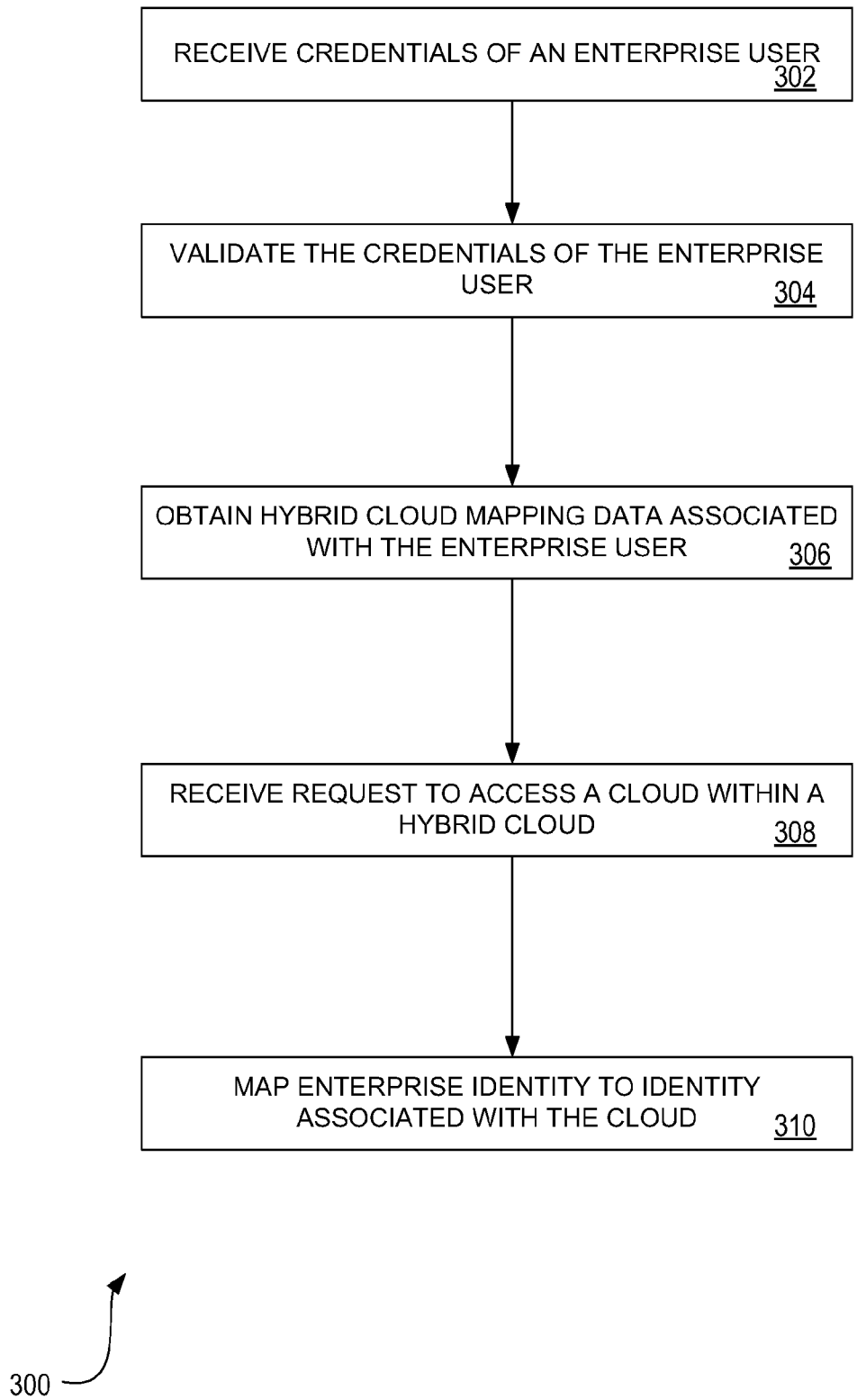
FIG. 3 depicts a flow diagram of a general overview of an exemplary method, in accordance with an exemplary embodiment.

FIG. 3 is a flowchart illustrating a method 300 for mapping enterprise identity in a hybrid cloud environment. The method 300 may be performed by one or more computational devices, as described below.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Method 300 is an example of an identification process that may be performed within a hybrid cloud environment, such as the system 100 shown in FIG. 1.

In block 302, the AA server 116 receives authentication data from the enterprise user that can be used to authenticate the enterprise user to the enterprise identification server 111. It is to be appreciated that various mechanisms may be used to receive authentication data from an enterprise user. For example, a client device may display a login screen that requests the enterprise user 118 to enter in a username and password corresponding to an enterprise account maintained by the enterprise (e.g., as may be stored in the enterprise identification server 111). Although a username-password pair is used to illustrate the operation of block 302, other embodiments may receive other types of authentication data. For example, an enterprise user may swipe a finger on a fingerprint reading device, perform a retinal scan, present their face in front of a camera for facial recognition, or other biometric scan. In another embodiment, a user may enter a card or device on which may be stored electronic identification.

After authentication data are received in block 302, e.g., by the client device, the authentication data may be authenticated and authorized in block 304. In one example embodiment, with reference to FIG. 1, the AA server 116 sends an authentication request message to the enterprise identity server 111. The enterprise identity server 111 may then compare the authentication data received in the authentication request message against the enterprise identity stored in the enterprise identity server 111.

In one embodiment, the authentication request message may be in the form of an LDAP bind message that is sent to the enterprise identification server 111. The LDAP bind message may used to establish the authentication state for a connection. In such embodiments, the LDAP bind message can include the user's DN and password. The enterprise identity server 111 may then check the password against an attribute of a directory entry matching the user's DN, such as the userPassword attribute. If the password matches the attribute of the corresponding entry, the enterprise identity server 111 may send an authentication request message to the AA server 116 that indicates whether the authentication data are valid.

Upon receiving an indication that the authentication data are valid, the AA server 116 then issues a token that is associated with the enterprise user's session. The token may be included in future messages exchanged within the system 100 to indicate the enterprise user involved in the operation. In some embodiments, the token can be transmitted to the client device so that the client device can include the token in future messages to the system 100. If the token indicates that the authentication data submitted authentication data were not valid, the client device may generate an error message.

Once the enterprise identification server 111 validates the authentication data supplied by the enterprise user, the AA server 116 then obtains the enterprise user's hybrid cloud mapping data. This is shown as block 306. As explained above, hybrid cloud mapping data may include the cloud roles associated with the enterprise user and mapping levels associated with a particular cloud. To obtain the hybrid cloud mapping data associated with the enterprise user, the AA server 116 may send a hybrid cloud mapping data request message to the hybrid identity mapper 112. In some embodiments, the hybrid cloud mapping data request message may include the token generated for the enterprise user upon validation of the enterprise user's authentication data.

To illustrate the type of information that the hybrid identity mapper 112 can return responsive to receiving a hybrid cloud mapping data request message, the hybrid identity mapper 112 may process the token to identify that the enterprise user has been authenticated by the AA server 116. In turn, the hybrid identity mapper 112 can then search a local database to determine the cloud roles associated with the enterprise user 118. Such roles can include, for example, public cloud admin, public cloud user, private cloud admin, private cloud user, internal cloud admin, internal cloud user, or any combination thereof. The various cloud roles may characterize the access rights an enterprise user has with respect to a cloud. For example, the cloud role may determine whether an enterprise user may create, update, or delete an instance of a cloud application.

Further, the hybrid identity mapper 112 can determine the mapping levels for the enterprise user 118. For example, the hybrid identity mapper 112 can return whether the enterprise user has a federated mapping to the enterprise identity or a custom mapping. As used herein, "PL1" may refer to a mapping level that provides federated mapping for a public cloud (e.g., the public cloud 102 of FIG. 1). As used herein, "XL1" may refer to a mapping level that provides federated mapping for a private cloud (e.g., the private cloud 104 of FIG. 1). "Federated mapping" may refer to the mapping where the identity used in a private or public cloud is the same identity used in the enterprise identity directory.

As used herein, "PL2" may refer to a mapping level that provides custom mapping for a public cloud (e.g., the public cloud 102 of FIG. 1). As used herein, "XL1" may refer to a mapping level that provides custom mapping for a private cloud (e.g., the private cloud 104 of FIG. 1). "Custom mapping" may refer to the mapping of the enterprise identity from an enterprise identity directory to a public or private cloud identity directory.

In the case the enterprise user 118 maps to a custom mapping level (e.g., PL2 or XL2), the hybrid identity mapper may determine the mapping from the enterprise identity to a DIT sub-tree of the public or private cloud 102, 104, respectively. For example, with reference to FIG. 4A, the hybrid identity mapper 112 may configure the mapping for XL2 using the rule that any enterprise user in the internal cloud identity directory 202 that belong to the parent "ou=West,ou=Engineering,c=ebay" (distinguished name 402) maps to the private cloud identity directory 204 distinguished name "cn=tuser1,ou=tech,c=ebay" (distinguished name 404).

Figure 4A:
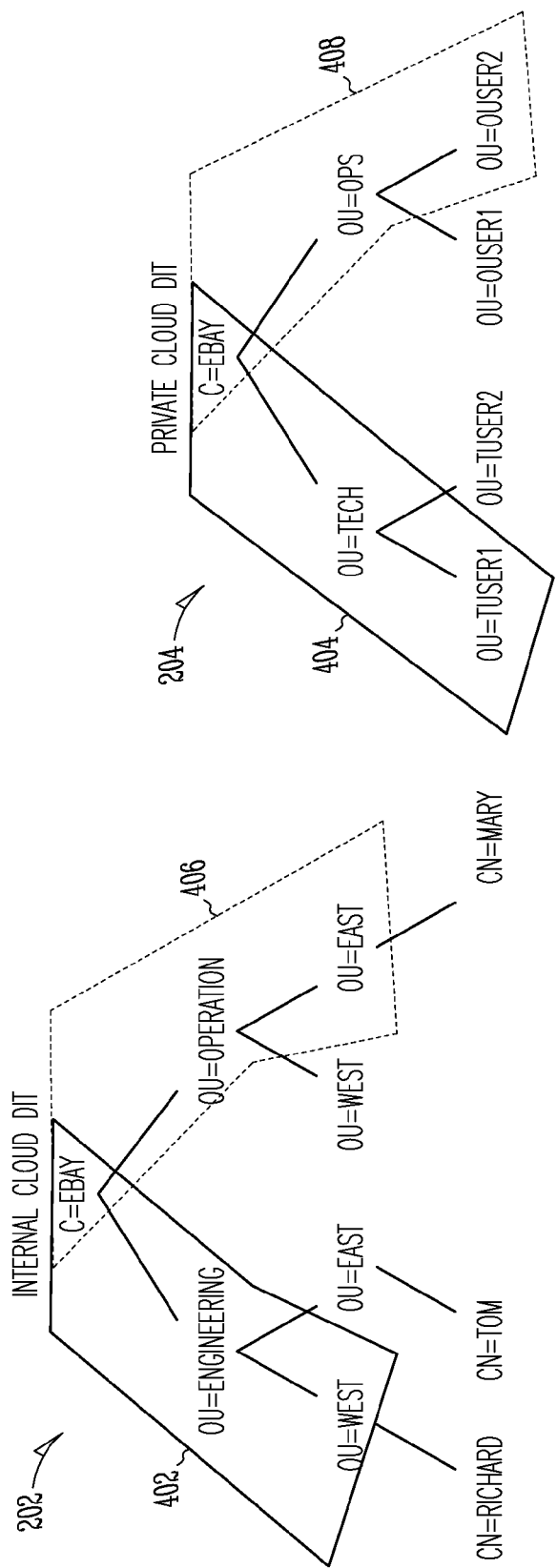
FIGS. 4A and 4B depict diagrams that illustrate mappings between an enterprise identity and a cloud identity, in accordance with an exemplary embodiment.

Alternatively, with reference still to FIG. 4A, any enterprise user with a distinguished name ou=East,ou=Operation, c=ebay 406 in the internal cloud identity directory 202 will map to distinguished name cn=ouser2,ou=ops,c=ebay 408 of the private cloud identity directory 204.

According to such mappings shown in FIG. 4A, the node "cn=Richard" in the internal cloud identity directory 202 (corp DIT) will then map to node cn=tuser1 in the private cloud identity directory 204 and the node "cn=Mary" in the internal cloud identity directory 202 (corp DIT) will then map to node cn=ouser2 in the private cloud identity directory 204.

Figure 4B:
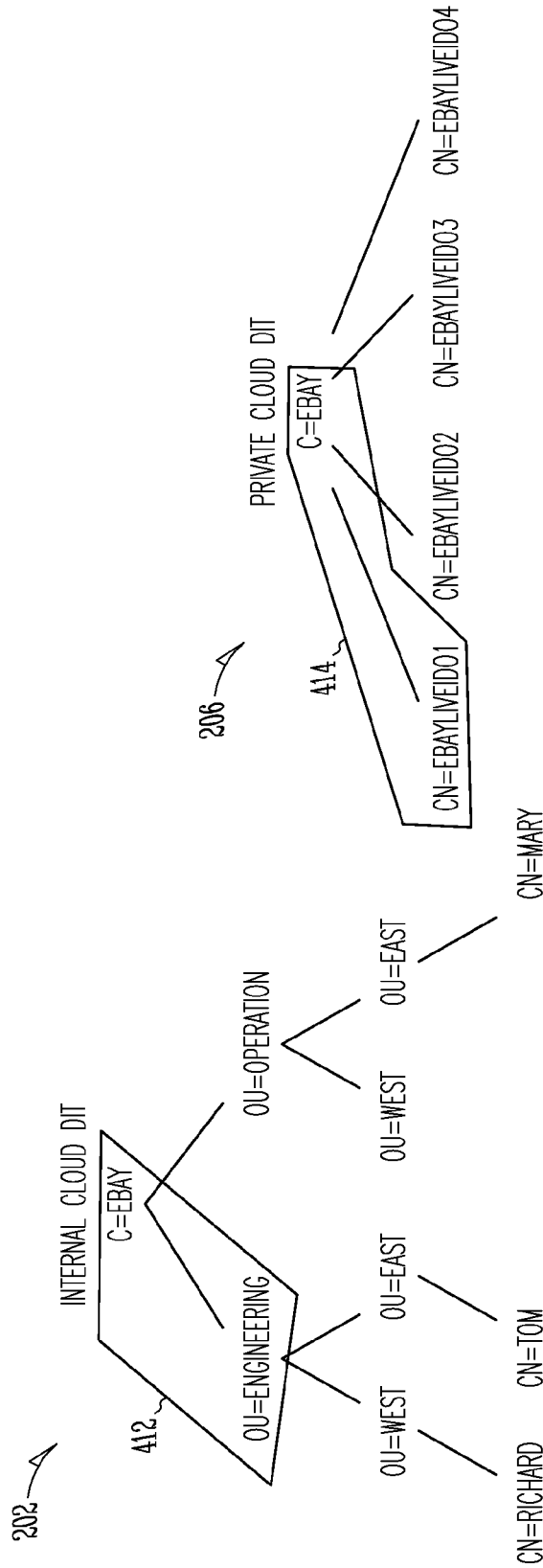

The hybrid identity mapper 112 can make a similar mapping of the enterprise identity from an enterprise identity to a DIT sub-tree of the public cloud. To illustrate one such mapping, with reference to FIG. 4B, for users assigned the role of Public Cloud User, the XL2 mapping can be as follows: any enterprise user in the internal cloud identity directory 202 under the distinguished name "ou=Engineering,c=ebay" 412 will then map to the distinguished name "cn=ebayliveID01,c=ebay" 414 in the public cloud identity directory 206. Accordingly, cn=Richard and cn=Tom both would map to ebayliveID01 when performing operations in the public cloud.

The AA server 116 then sends the token, cloud roles, and mappings to the cloud administration server 114. The cloud administration server 114 then stores the token, cloud roles, and mappings. For example, the cloud administration server 114 may link the token to a cloud role and to a private cloud identity and to a public cloud identity.

Later, when the enterprise user 118 requests a particular action (e.g., instantiate a cloud application, update a cloud application, delete a cloud application, or any other cloud activity), the cloud administration server 114 can use the token, cloud role, and mappings to perform the requested action. With reference back to FIG. 3, this is shown in blocks 308, 310. For example, the enterprise user 118 may send a request (for example, using a client device) to the cloud administration server 114 to perform a cloud activity. The request may include the token assigned to the enterprise user when the enterprise user 118 was authenticated and authorized by the AA server 116. The cloud administration server 114 may then use the token to lookup the enterprise user's cloud role to determine if the enterprise user 118 is authorized to perform the requested action. If yes, the cloud administration server 114 then determines whether the enterprise identity of the enterprise user should be mapped to an identity corresponding to the cloud being accessed. For example, the cloud administration server 114 may use a distinguished name mapped to a sub-tree of a directory of a cloud, such as distinguished names 404 or 408 of FIG. 4A, or 414 of FIG. 4B.

Thus, from the perspective of the cloud (e.g., 102, 104) that the enterprise user is accessing, the cloud receives identity information mapped to the sub-tree of the cloud directories (e.g., 204, 206 of FIG. 2). In this way, the cloud does not receive identity information (e.g., corporate username) from the internal directory 202.

Embodiments of the present invention provide a number of advantages. For example, embodiments may secure and hide enterprise identity from outside cloud services. Further, embodiments may provide flexibility for the enterprise to select the level of security in the hybrid cloud. For example, the enterprise may select federated all the way for one cloud provider, hide all enterprise identity for another cloud, and something in-between for other clouds.

Example embodiments may also provide central management of identities and mapping levels. Further, embodiments may provide the ability to add cloud providers without any reconfiguration at the corporate identity levels. Still further, example embodiments may operate without requiring an customized software, such as SAML 1.1.2.0 service provider on the cloud provider, if custom mapping levels are utilized.

Modules, Components, and Logic

Additionally, certain embodiments described herein may be implemented as logic or a number of modules, components, or mechanisms. A module, logic, component, or mechanism (collectively referred to as a "module") may be a tangible unit capable of performing certain operations and is configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by cost and time considerations.

Accordingly, the term module should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Electronic Apparatus and System

Exemplary embodiments may be implemented in analog, digital, or hybrid electronic circuitry, or in computer hardware, firmware, software, or in combinations thereof. Exemplary embodiments may be implemented using a computer program product, for example, a computer program tangibly embodied in an information carrier (e.g., in a machine-readable medium for execution by, or to control the operation of, data processing apparatus, for example, a programmable processor, a computer, or multiple computers).

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

In certain exemplary embodiments, operations may be performed by one or more programmable processors executing a computer program to perform functions by operating on input data and generating output. Method operations can also be performed by, and apparatus of exemplary embodiments may be implemented as, special purpose logic circuitry (e.g., a field programmable gate array (FPGA) or an application-specific integrated circuit (ASIC)).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination permanently and temporarily configured hardware may be a design choice. Below are set out hardware (e.g., machine) and software architectures that may be deployed, in various exemplary embodiments.

Exemplary Machine Architecture and Machine-Readable Medium

Figure 5:
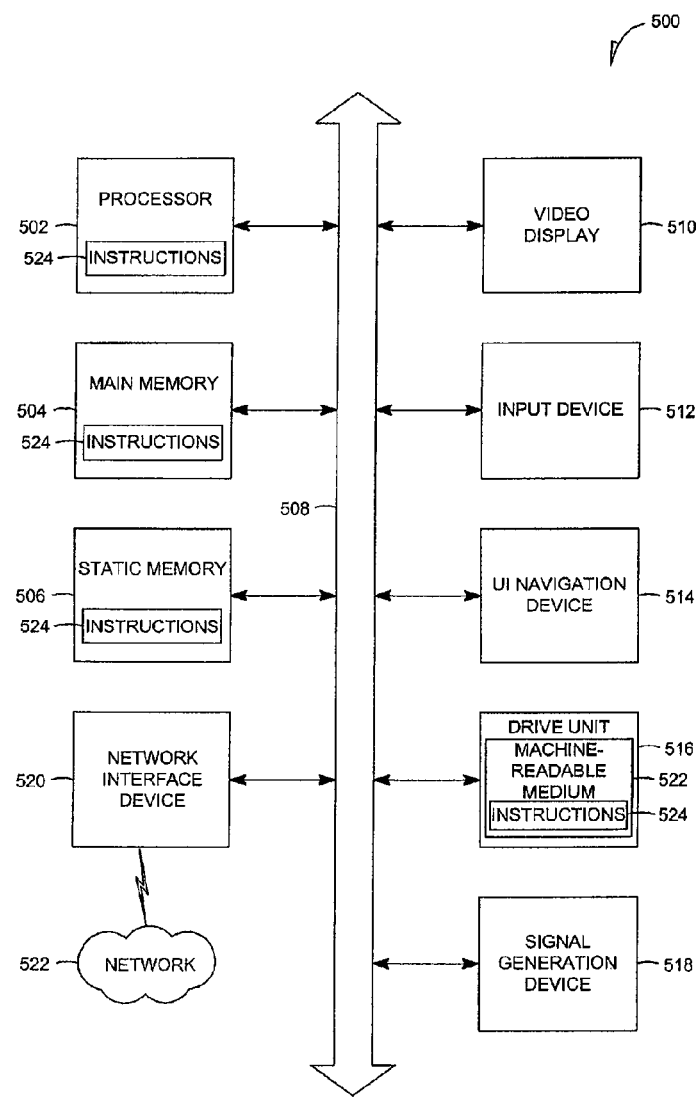
FIG. 5 is a simplified block diagram of a machine in an exemplary form of a computing system within which a set of instructions, for causing the machine to perform any one or more of the methodologies discussed herein, may be executed.

With reference to FIG. 5, an exemplary embodiment extends to a machine in the exemplary form of a computer system 500 within which instructions, for causing the machine to perform any one or more of the methodologies discussed herein, may be executed. In alternative exemplary embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker), and a network interface device 520.

Machine-Readable Medium

The disk drive unit 516 includes a machine-readable medium 522 on which is stored one or more sets of instructions and data structures (e.g., software 524) embodying or utilized by any one or more of the methodologies or functions described herein. The software 524 may also reside, completely or at least partially, within the main memory 504 or within the processor 502 during execution thereof by the computer system 500; the main memory 504 and the processor 502 also constituting machine-readable media.

While the machine-readable medium 522 is shown in an exemplary embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of exemplary semiconductor memory devices (e.g., EPROM, EEPROM, and flash memory devices); magnetic disks such as internal hard disks and removable disks; magneto-optical disks; and CD-ROM and DVD-ROM disks.

Transmission Medium

The software 524 may further be transmitted or received over a communications network 522 using a transmission medium via the network interface device 520 utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Exemplary Three-Tier Software Architecture

In some embodiments, the described methods may be implemented using a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data input through the interface level. The logic tier may communicate the results of such processing to the interface tier, or to a backend or storage tier. The processing performed by the logic tier may relate to certain rules or processes that govern the software as a whole. A third storage tier may be a persistent storage medium, or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology or a variety of technologies. The exemplary three-tier architecture, and the technologies through which it is implemented, may be realized on one or more computer systems operating, for example, as a standalone system, or organized in a server-client, peer-to-peer, distributed, or some other suitable configuration. Further, these three tiers may be distributed between more than one computer system as various components.

Components

Exemplary embodiments may include the above described tiers, and processes or operations about constituting these tiers may be implemented as components. Common to many of these components is an ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented or object-oriented programming technique can be implemented using a Visual Component Library (VCL), Component Library for Cross Platform (CLX), JavaBeans (JB), Enterprise JavaBeans™ (EJB), Component Object Model (COM), Distributed Component Object Model (DCOM), or any other suitable technique.

Software for these components may further enable communicative coupling to other components (e.g., via various APIs), and may be compiled into one complete server, client, or peer software application. Further, these APIs may be able to communicate through various distributed programming protocols as distributed computing components.

Distributed Computing Components and Protocols

Some exemplary embodiments may include remote procedure calls being used to implement one or more of the above described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above described object-oriented programming techniques and can be written in the same programming language or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model or Transmission Control Protocol/Internet Protocol (TCP/IP) protocol stack model for defining the protocols used by a network to transmit data.

A System of Transmission Between a Server and Client

Exemplary embodiments may use the OSI model or TCP/IP protocol stack model for defining protocols used by a network to transmit data. In applying these models, a system of data transmission between a server and client, or between peer computer systems, may, for example, include five layers comprising: an application layer, a transport layer, a network layer, a data link layer, and a physical layer. In the case of software for instantiating or configuring components having a three-tier architecture, the various tiers (e.g., the interface, logic, and storage tiers) reside on the application layer of the TCP/IP protocol stack. In an exemplary implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data are transmitted over a network such as an internet, LAN, WAN, or some other suitable network. In some cases, Internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology) or structures.

Although an embodiment has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually or collectively, by the term "invention" merely for convenience and without intending to voluntarily limit the scope of this application to any single invention or inventive concept if more than one is, in fact, disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

For example, particular embodiments describe various arrangements, algorithms, programming tools, and topologies of systems. A skilled artisan will recognize, however, that additional embodiments may be focused on performance and usability of the internal cloud infrastructure system.

These and various other embodiments are all within a scope of the present invention. The specification and drawings are, accordingly, to be regarded in an illustrative rather than a restrictive sense.

What is claimed is:

1. A system, comprising:
   at least one processor;
   a hybrid identity mapper implemented by the at least one processor and configured to:
      access an enterprise identity, usable in an internal cloud of an enterprise, the enterprise identity stored as an entry in a directory of the internal cloud under a first distinguished name;
      map the first distinguished name to a second distinguished name in a directory of at least one external cloud; and
   an administration server configured to, based on the mapping between the first distinguished name to the second distinguished name, allow a user of the enterprise identity to access the at least one external cloud using an external identity comprising the second distinguished name.

2. The system of claim 1, wherein the hybrid identity mapper is further configured to map an enterprise identity directory and a cloud identity directory associated with the internal cloud.

3. The system of claim 2, wherein the hybrid identity mapper is further configured to map the enterprise identity to a cloud role used to determine how the enterprise identity interacts with the internal cloud and the at least one external cloud.

4. The system of claim 3, wherein the cloud role indicates at least one of rights to create an instance of a cloud application, rights to update the instance of the cloud application, or rights to delete the instance of the cloud application.

5. The system of claim 1, wherein the hybrid identity mapper is further configured to synchronize identity mapping data with identity management servers associated with the at least one external cloud.

6. The system of claim 1, wherein the hybrid identity mapper further maps the first distinguished name to additional external identities usable in one or more public or private external clouds.

7. The system of claim 1, wherein the external identity is the same as the enterprise identity.

8. A method, comprising:
   storing an enterprise identity usable in an internal cloud of an enterprise as an entry in a directory of the internal cloud under a first distinguished name;
   mapping, by a hardware processor, the first distinguished name to a second distinguished name in a directory of the at least one external cloud; and
   based on the mapping, allowing a user of the enterprise identity to access the external cloud using an external identity comprising the second distinguished name.

9. The method of claim 8, further comprising mapping an enterprise identity directory and a cloud identity directory associated with the internal cloud.

10. The method of claim 9, further comprising mapping the enterprise identity to a cloud role used to determine how the enterprise identity interacts with the internal cloud and the at least one external cloud.

11. The method of claim 10, wherein the cloud role indicates at least one of rights to create an instance of a cloud application, rights to update the instance of the cloud application, or rights to delete the instance of the cloud application.

12. The method of claim 8, further comprising synchronizing identity mapping data with identity management servers associated with the at least one external cloud.

13. The method of claim 8, further comprising mapping the first distinguished name to additional external identities usable in one or more public or private external clouds.

14. The method of claim 8, wherein the external identity is the same as the enterprise identity.

15. A machine-readable storage medium having no transitory signals and storing a set of instructions that, when executed by at least one processor of a machine, causes the machine to perform operations comprising:
   storing an enterprise identity usable in an internal cloud of an enterprise as an entry in a directory of the internal cloud under a first distinguished name;
   mapping, by a hardware processor, the first distinguished name to a second distinguished name in a directory of the at least one external cloud; and
   based on the mapping, allowing a user of the enterprise identity to access the external cloud using an external identity comprising the second distinguished name.

16. The machine-readable storage medium of claim 15, wherein the operations further comprise mapping an enterprise identity directory and a cloud identity directory associated with the internal cloud.

17. The machine-readable storage medium of claim 16, wherein the operations further comprise mapping the enterprise identity to a cloud role used to determine how the enterprise identity interacts with the internal cloud and the at least one external cloud.

18. The machine-readable storage medium of claim 17, wherein the cloud role indicates at least one of rights to create an instance of a cloud application, rights to update the instance of the cloud application, or rights to delete the instance of the cloud application.

19. The machine-readable storage medium of claim 15, wherein the operations further comprise synchronizing identity mapping data with identity management servers associated with the at least one external cloud.

20. The machine-readable storage medium of claim 15, wherein the operations further comprise mapping the first distinguished name to additional external identities usable in one or more public or private external clouds.

* * * * *